United States Patent [19]
Levesque

[11] 3,981,336
[45] Sept. 21, 1976

[54] TREE HARVESTER

[75] Inventor: Joseph Lucien Levesque, Cochram, Canada

[73] Assignee: L & L Logging Research Limited, Timmins, Canada

[22] Filed: May 28, 1974

[21] Appl. No.: 474,053

Related U.S. Application Data

[63] Continuation-in-part of Ser. No. 260,278, June 6, 1972, abandoned.

[52] U.S. Cl. .............................. 144/3 D; 144/2 Z; 144/34 E; 144/309 AC
[51] Int. Cl.² ........................................ A01G 23/08
[58] Field of Search ................. 144/2 Z, 3 D, 34 R, 144/34 A, 309 AC, 34 E

[56] References Cited
UNITED STATES PATENTS

| | | | |
|---|---|---|---|
| 3,542,099 | 11/1970 | Gibson | 144/3 D |
| 3,707,175 | 12/1972 | Propst | 144/3 D |
| 3,797,539 | 3/1974 | Mosen et al. | 144/3 D |
| 3,797,540 | 3/1974 | Propst | 144/3 D |
| 3,797,541 | 3/1974 | Kurelek et al. | 144/3 D |

FOREIGN PATENTS OR APPLICATIONS

| | | | |
|---|---|---|---|
| 889,112 | 12/1971 | Canada | 144/3 D |

*Primary Examiner*—Othell M. Simpson
*Assistant Examiner*—W. D. Bray
*Attorney, Agent, or Firm*—K. M. Hill

[57] ABSTRACT

The following specification discloses a tree harvesting apparatus controlled from a light weight tracked vehicle having a rotatable platform for holding a boom apparatus to which a harvester head is hingeably attached. The harvester head comprises shearing means and delimbing knives mounted to a support member which can be positioned by the boom against a tree to be severed and then rotated into a horizontal position for the delimbing and severing of a tree into bolts in proximity and to the side of the control vehicle.

4 Claims, 13 Drawing Figures

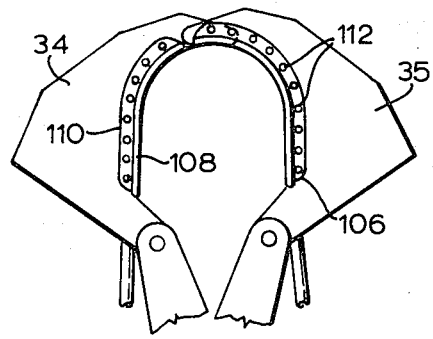
FIG.10
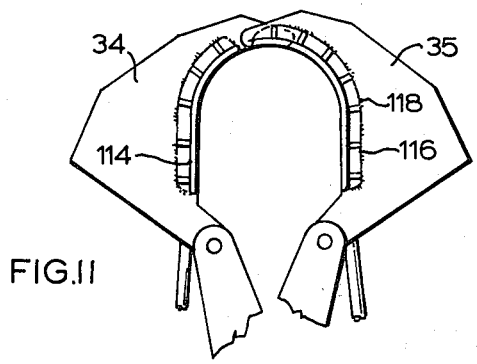
FIG.11
FIG.12        FIG. 13
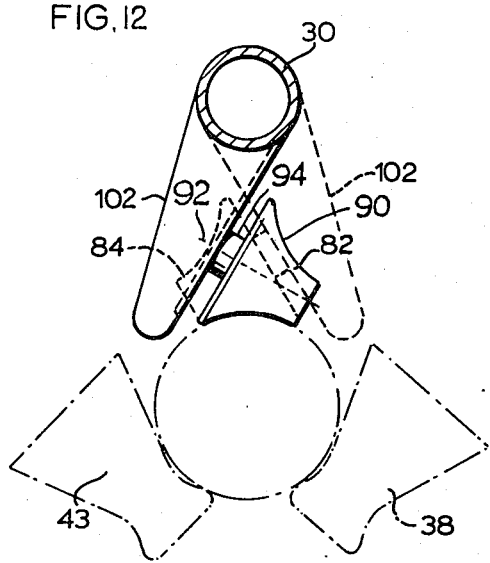
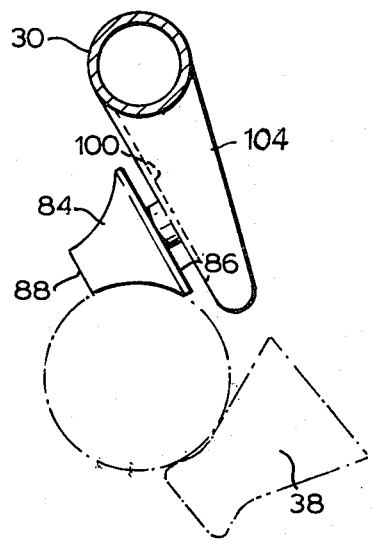

TREE HARVESTER

The following disclosure contains a correct and full description of the invention and of the best mode known to the inventor of taking advantage of the same, this application being a continuation-in-part of my earlier patent application Ser. No. 260,278 filed June 6th, 1972 now abandoned.

The present invention relates to a mobile tree harvester capable of advancing in stages through a stand of trees, cutting, delimbing and stacking bolts of timber at each as it proceeds. In particular the present invention provides a tree harvesting device that is sufficiently light in weight as to be capable of advancing through muskeg or snow to cut, delimb and stack bolts of timber from the trees encountered in a swath around its path of advance.

BACKGROUND OF THE INVENTION:

It is known that much of Northern and Eastern Canada is covered with virgin first and second growth of timber and pulp-producing trees which have been traditionally harvested by family concerns usually working during those months when the ground is sufficiently hard to walk on and when their farm work is slack. With the disappearance of the small family axe-wielding operation in favor of larger groups and companies, more mechanization of the tree harvesting business has been possible. As a consequence large tree harvesting devices have been manufactured that are capable of cutting and carrying the trunks of large trees on site. Much of the delimbing operations are still done by men wielding chain-saws, after the trunk is felled by machine, but the accident rate for delimbing with chain saws is very high and a better method is desirable.

Because of the relatively recent recession of the glaciers during the last Ice Age, the North is generally covered with an abundance of swampy wet terrain which is very fertile. Vast amounts of this ground has grown over in large very dense patches of Black Spruce. Due to the short growing periods of the northern summer, the rate of growth is slow in proportion to the more clement temperatures of Southern Canada and the United States. As a consequence large tree harvesting machines conceived and designed for conditions which exist in the south are ineffective and often immobilized by the soft, wet ground conditions in the north in the summer, and deep snow when the ground is frozen in the winter. The many pulp and paper, and saw mills, which exist in Northern Canada form a large forest industry. Many companies have their own woods department which cut and supply the logs required although most of the companies have several smaller contractors which supply wood. Some of the contractors have expanded to a point where they supply two or three concerns. All of these companies are still cutting and delimbing the majority of their wood by conventional chain saw methods. A few companies have acquired feller-buncher machines which simply cut the trees and lay them on the ground in bunches. However the delimbing which produces the highest number of chain saw accidents, is still done by a man wielding a chain saw.

This particular set of conditions—wet, soft terrain, deep snow, cold weather, high accident rates, high city wages, demanding physical work, not to mention an abundance of black flies, makes it increasingly difficult for the contractor to interest the average modern young man in cutting timber for a living. The contractors' biggest problem is obtaining the manpower required to do the work at a reasonable rate of pay. This is the most important factor in the contractors' desire to mechanize his forest operations. This has created a large demand for a tree harvester which could operate effectively at a profit. The tree harvesters presently used have been conceived for conditions other than found in the North. They are quite large in order to cut trees which grow much larger in other regions and they also have a different method of processing which inherently must produce a heavier larger machine. These machines delimb the trees while they are at their full length. This dictates the use of a mechanism which is made of delimbing knives capable of encircling the trunk and travelling the full length of the tree. This means the mechanism must extend and retract at least 50 to 60 feet, whether it be in horizontal or vertical position. This method dictates the shape of the mobile machine which must be large and heavy to support this mechanism. Such devices are useful in regions where the terrain is firm and capable of supporting high load concentrations. They are not economical under northern conditions.

The tree harvesters presently used are quite large in order to cut the largest trees and are therefore not capable of travelling over muskeg and soft ground or snow because of their weight and the weight of the large booms necessary for cutting and delimbing a tree while it is in an upright position. Such devices are very useful in virgin stands of timber such as are found on the West coast, but such large machines are not economical for the many small jobbers that operate in Eastern Canada whose principal source of harvestable material is spruce and aspen stands located on soft muskeg ground.

SUMMARY OF THE PRESENT INVENTION:

It is the principal object of the present invention therefore to construct a mobile apparatus capable of travelling across soft ground or muskeg and having a cab for the protection of an operator who could employ the machine in all types of weather and having operated from it a mechanism for cutting and gripping a tree trunk at its butt of a diameter in the range of 3½ to 14 inches and which has operated from and attached to it apparatus for delimbing the tree, cutting it into bolts of specified length and piling them for collection by other lightweight vehicles.

The invention herein contemplates a mobile tree harvester particularly designed for bush conditions of Northern and Eastern Canada. To achieve the object of the invention it has been appreciated that two principles must be understood: firstly, the employment of telescopic booms to cut and delimb trees in their standing position creates an unwieldy device which is known to cause much breakdown problems and to require, because of its size and weight, a good roadbed for it to advance to the site of the timber; and secondly, a harvester must be broad in the base for balance while the boom is in an extended cutting position at the top of the tree.

Realizing the disadvantages of the known machines the invention herein contemplates the delimbing and cutting up of a tree in a horizontal ground position after the butt has been cut and the tree lowered to the ground. After cutting, the tree in the present invention is first rotated through an arc to a position 90° to the path of advance thereby for ease of processing as hereinafter described.

It is also known by the present method of delimbing trees in their vertical position before cutting by boom-type harvesters, that the trunk can be shattered and damaged when it falls without limbs to cushion the fall. The present invention contemplates leaving the limbs on the trees until it is in a fallen position thereby protecting it from shocks during the fall. The cushion of the branches has been found to be an advantage achieved by the method and structure of the invention disclosed herein.

The apparatus of the invention is attached to a large platform constructed to swivel between wide load bearing tracks each made of two conveyor type belts held together by bolted cross pieces and driven by hydraulically powered sprockets. The under-carriage holding the swivel bearing to which the platform is attached is a combination of beams and spindles designed to transmit load from the swivel bearing to the ground through the tires that roll inside the track mechanism. The track portion of the apparatus provides the mobile part and has on its platform a diesel motor which operates a hydraulic pump means which provides the hydraulic power to the harvesting mechanisms and the track hydraulic motors. A cab is provided on the platform to enclose an operator and can have heaters and defrosters to allow operation of the apparatus in cold weather. The cab, oil tanks and hydraulic fluid tanks are positioned along one side of the platform. The other side of the platform is reserved for the functioning of a retractable boom to which the harvester processing head is attached. The boom is pivotted on one side of the platform, and is retractable into a cage, and has a swivel attachment for articulation forward and backward for positioning the harvester head against a tree. It is capable of drawing the butt of the tree toward the mobile unit where a butt plate is positioned against the platform to allow a fix on the trunk to measure a specified length of bolt before cutting of the log into a specific length.

A processing head is hingibly mounted at the end of the articulated boom and can be moved into and from any vertical or horizontal position by the boom to position the head against an upright or falling tree at any angle of lean. The processing head consists primarily of a support to which all the cutting components are attached, the support itself being hingibly mounted to the boom. When the boom is in a horizontal position with the support hingibly swung into a vertical position against a standing piece of timber a shearing mechanism which is enclosed in a butt housing located at the bottom of the support, is moved into encircling position about a tree. Holding arms mounted above the shearing device, are located on the upper end of the support and have hydraulic actuating mechanisms to position and hold the arms with adequate pressure on the tree trunk to insure that it is kept rigid during and after the shearing operation.

The cutting mechanism consists of a pair of shear-like cutting edges which are hydraulically operated and cut the tree with a bite-shear action. During shearing a wedge action of the thick of the cutting edge is imposed on the tree causing an upward popping action of the tree bolt from the butt before the shears complete their inward cutting action. This wedge action allows the shears to be designed so that they never meet and therefore prevents them damaging one another by striking after the bite is completed. The shear-cutting action of the shears of the present invention provides a clean uniform cut from both sides of the tree which is not possible with most types of cutting, thereby saving material and giving a superior product especially when the bolt is to be later used for lumber.

To insure that the forward movement of the apparatus is not impeded by slash, cuttings, or the severed bolts of timber, the apparatus herein delimbs the tree in a side position out of its forward path. This is done by first lifting the severed tree from its stump and swivelling the tree through an arc to bring it into a position substantially 90° to the path of travel of the unit before the tree is allowed to fall to a horizontal position for further work. In order that the tree can be moved with the least strain on the parts of the machine, it is lifted from its stump and inclined toward the mobile unit to insure that the centre of mass of the tree centers over the pivot point in the mobile unit thereby allowing for smooth movement of it through the arc and to avoid backlash of the tree when the boom and platform stops its swivel motion at the side position. During the positioning of a tree from the vertical to the horizontal controlled hydraulically operated movement of the support hinging forward on the end of the boom allows the tree to be gently lowered while the gripping arms hold the tree until the branches strike the ground. With the processing head now holding the tree in a horizontal position above the ground and in parallel with the extensible boom arm to which it is attached the delimbing step can commence. When the processing head is pivoted to lie below and parallel to the boom, the shear housing rests nearest the mobile unit with the tree butt firmly held in its grip.

An idler roller is positioned immediately above the shear unit to assist in feeding the trunk through the delimbing knives. The shear housing holds the butt of the cut tree during its descent and movement from the swath path of the vehicle, by the simple mode of keeping the knives shut in a butting relationship. Upon release of the abutting knives, the tree can pass through its open jaws. The holding arms remain in position encircling the trunk during descent and processing. The tree feed rollers which are integrally associated with the arms, are then hydraulically actuated to feed the tree into the delimbing knives. The knives comprise a set of adjustable, and a fixed knife. The adjustable knives are supported by a rigid member functioning as a frame for the whole processing head, and are positioned under spring tension above and around the tree where they shear the limbs from it as the tree is fed toward the control mobile unit. When the butt of timber comes into contact with the stop plate positioned and held to the platform, further forward movement is arrested. The operator will now from the control cab of the mobile unit actuate the shear knives in the shear housing by hydraulic means to cut a bolt of timber from the tree as it is held in the horizontal position. The bolt will be a measured length of the tree. The head on the boom is known to be a set distance from the platform and therefore all cut bolts will be of equal length when cut after the butt reaches the platform stop plate during the delimbing. The measured and cut bolts drop after shearing to lie together beneath the processing head. With the shears drawn back into their housing the delimbing step continues by the operators reactivating the power to the roll pullers to advance the tree forward again through the knives toward the stop to delimb another specific length of bolt.

Since delimbing takes place in stages where the mobile unit happens to stop in its swath, the slash will occur in orderly piles where it can be easily dealt with by burning or by bailing. Similarly, the logs or bolts of equal length rest in neat piles for easy collection. After one tree has been dealt with the boom is rotated back towards the stand of trees or windfalls in the path of the vehicle where the processing head is positioned against another tree for shearing at its butt and close to the ground. The combined interplay of the telescoping boom in its cage, the movement of the boom on its pivot, and the swivel action of the platform, permits a number of trees to be cut and processed before the harvester need be moved ahead in its path. It can be operated to place the delimbed bolts in places convenient for loading onto trucks or into rivers and barges, for example. The above advantages are accomplished by the feature of the boom being capable of accurate motion through 180 degrees or more on the platform swivel bearing, and the delimbing being done out of its path where slash will not impede it.

It is a further object of the present invention to provide a tree harvester having a boom means capable of movement in a horizontal plane and with the pick up head or processing unit capable of shearing action while at a considerable angle to the vertical, thereby permitting the harvester to retrieve windfalls lying in its path or swath.

The combined action of reciprocating in its sleeve or cage, and of tilting on a fulcrum on the platform, allows the boom to adjust to the height over the terrain level of any particular tree whether in a hole or on a rise in relation to the control vehicle, thereby permitting all stumps to be cut substantially flush with ground level.

It is a further object of the present invention, in a first alternative embodiment thereof to provide delimbing knives which are removably fastened to the inner edges of associated holding arms for replacement when in need of sharpening.

It is a further object of the present invention, in a second alternative embodiment thereof to provide delimbing knives which are secured as by welding to the inner edge of the associated holding arm for movement with the holding arm as if an integral part thereof.

It is a still further object of the present invention to provide the means including a pair of spaced concavely conical idler rollers co-axial with the tree-trunk pull-through rollers, the two idler rollers being axially relatively radially angulated to co-operate with a primary spacer roller near the tree-severing end of the machine and with a stationery delimbing knife at the opposite end of the machine to maintain the tree rigidly well-spaced from and parallel to the main support means or supporting tube or frame of the machine to avoid breakdown by the interference of unwanted limbs between the trunk and the said support means or frame.

BRIEF DESCRIPTION OF THE DRAWINGS:

With the considerations and inventive objects herein set forth in view, and such other or further purposes, advantages or novel features as may become apparent from consideration of this disclosure and specification, the present invention consists of the inventive concept which is comprised, embodied, embraced, or included in any means, method, process, product, construction, composition, arrangement or combination of parts, or new use of any of the foregoing, which may herein be exemplified in one or more specific embodiments of such concept, reference being had to the accompanying drawings in which:

FIG. 10 is a fragmentary representation in plan of a first alternative to the pivoted stripping or delimbing blades shown in FIG. 4, where the said blades are detachably fastened to the associated holding-arm by a bolt means.

FIG. 11 is a similar representation to FIG. 10 wherein the blades are shown welded to the said holding-arms and suitably stiffened by a set of fish-plates.

FIG. 12 is a fragmentary representation in plan showing one of the upper idler rollers shown in FIG. 4 and associated parts.

FIG. 13 is a fragmentary representation in plan similar to FIG. 12 showing the lower idler roller and associated parts as angularly related to the upper idler roller.

In the drawings, like characters of reference designate similar parts in the several Figures.

Figure 1:
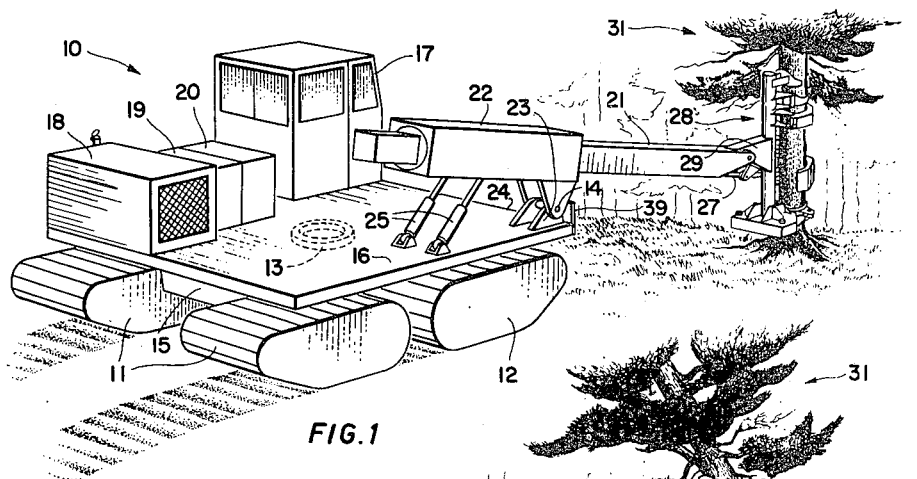
FIG. 1 is a view of the harvester with cab and boom shown in a position on the platform of a tracked vehicle and indicates the method of holding the processing unit against a tree with the shearing device fixed at the butt.
Figure 2:
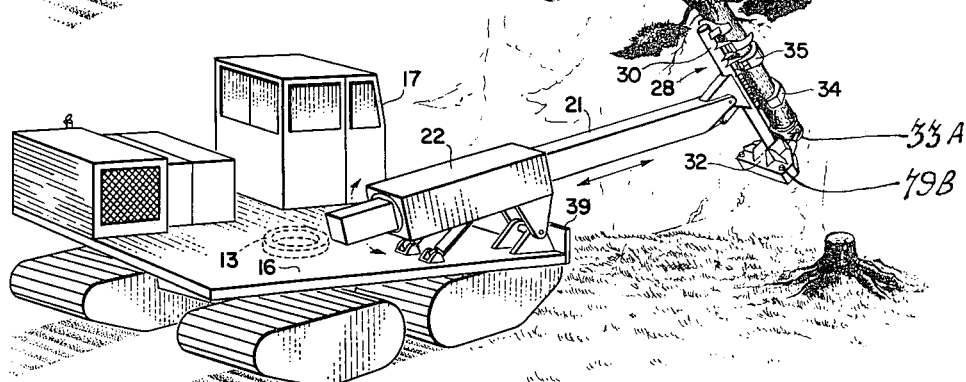
FIG. 2 shows how the boom and processing head grasp and lift a severed tree while being pivoted by the control unit to a delimbing position clear of the path of travel of the harvester.
Figure 3:
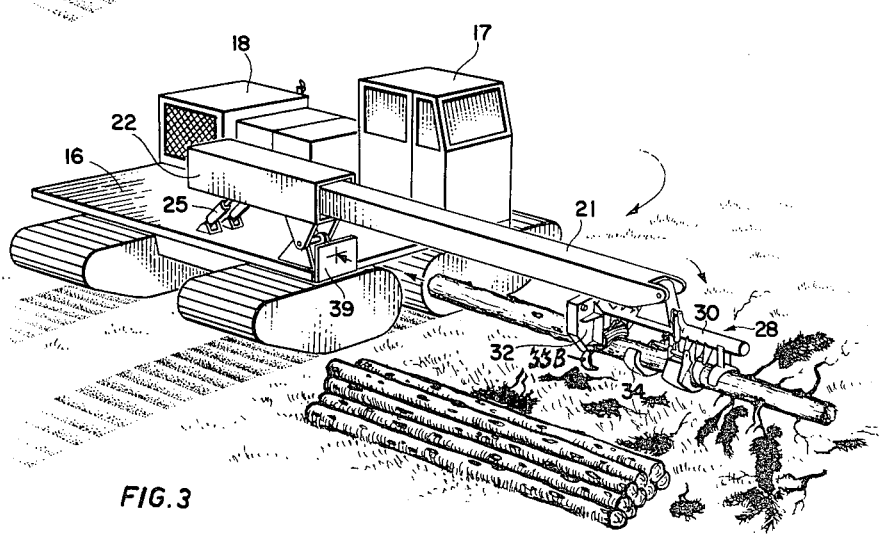
FIG. 3 shows the harvester in delimbing position with the boom holding the processing unit in substantially parallel relation to itself while extended outward horizontal to the terrain from the platform.

DESCRIPTION OF THE PREFERRED EMBODIMENT:

The harvester of the invention is shown in FIG. 1 with the control unit 10, being a self-propelled tracked vehicle having two pair of caterpillar type tracks 11, 12, each one of which can be independently controlled to move the unit around stumps and holes.

An hydraulic cylinder 46, is mounted on the frame 30, by a bearing pivot 47, and is operable to exert a force on the holding arm 35 and the puller 37 nesting with it, to encircle and grip the tree. A similar cylinder 48, pivotably mounted at 49, exerts force on arm 34, and puller 38.

A hydraulic oil accumulating device is associated with hydraulic cylinders 46, and 48, to insure that adequate pressure is maintained on the arms to keep them in feeding contact with the tree but preventing them from binding the tree in immovable fix against the fins 43.

The holding arms 34, 35, are during delimbing, in a constantly adjusting movement inward as the diameter of the tree diminishes to insure that roll pullers and the delimbing knives all carried by them, will be able to function with correct force. This is achieved by an automatic pressure adjust system incorporated in the hydraulics controlled at the cab. It is necessary that the pressure adjust be set to prevent stripping of bark from the tree but allowing forward movement to be imparted to the roll pullers 37, 38, which must run smoothly while adjusting to the uneven and changing surface contours of the tree.

Leaf spring means 51, 52 are associated with each of the knives 40, 41 to hold the knives in tense contact with the tree while being drawn into the limbs. Spacer means 53, are porvided to the inner surface of each of the knives to prevent the knives biting into the bark and allow irregularities on the tree to pass under the knives. The idler roll 36 aligns the tree toward the butt plate and provides a smooth ride through the pullers.

The delimbing knives 40, 41 are supported in bearings 55, 56 mounted on fixed supports 57, 58 held out from the frame 30. The ram end of hydraulic means 46, and the ram of means 48, are eccentrically mounted in bearings 60, and in bearing 61 respectively. The holding arms 34, 35 are also eccentrically mounted in bearings 62, 63 to insure that the conical pullers will give positive contact to variable diameters of trees that are encircled during delimbing.

Figure 4:
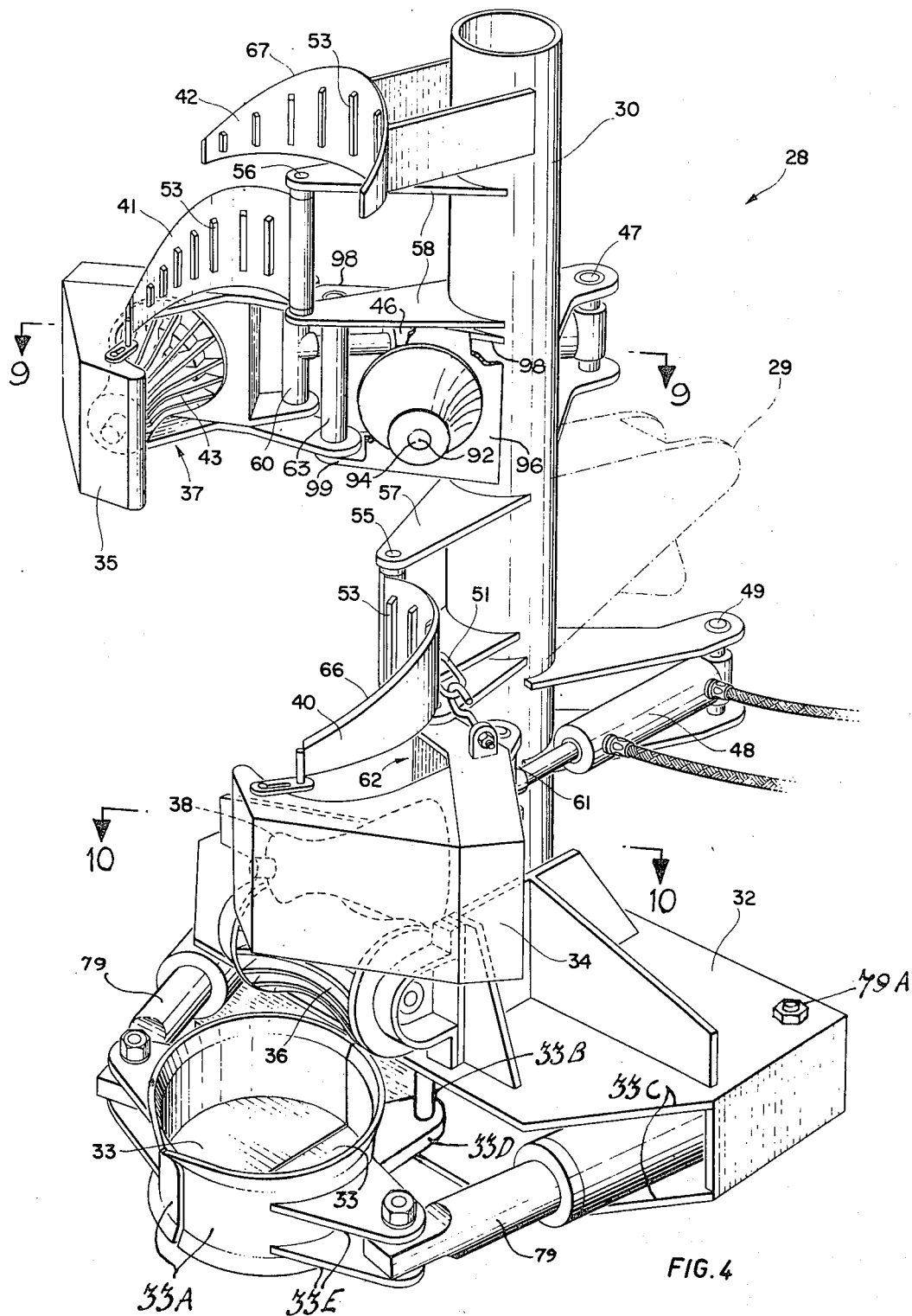
FIG. 4 is a perspective enlarged view of the processing unit showing the relative positions of the holding arms, roller means, cutting shears, delimbing knives, and the upper one of the pair of trunk-spacing idler rollers.
Figure 5:
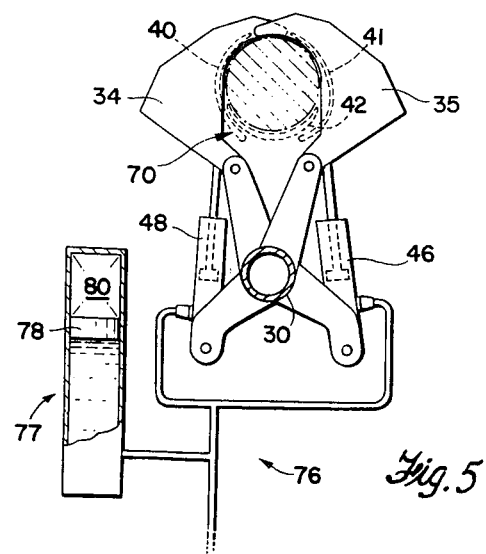
FIG. 5 is a plan view taken through the processing head to show how a tree trunk of maximum diameter is held between pullers and indicates the disposition of the pair of pivoted knives and stationery knife in this position of delimbing.
Figure 6:
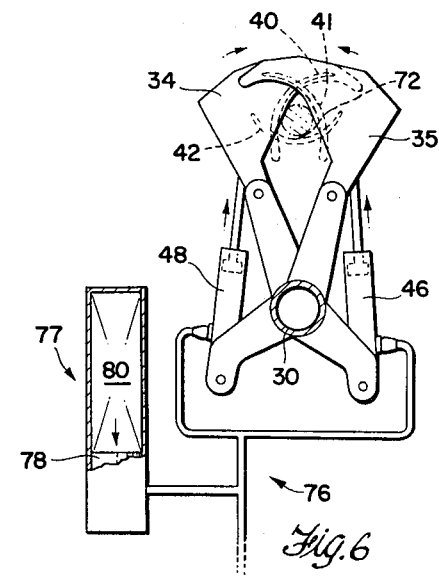
FIG. 6 is similar to FIG. 5 but shows the pivoted knives in the intercepting relationship which would obtain when the associated tree is of minimum diameter.
Figure 7:
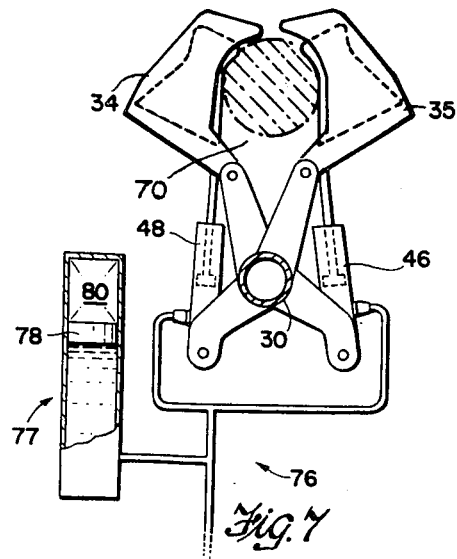
FIG. 7 is a view similar to that of FIG. 5 but depicts in phantom lines the disposition of the two roller-puller devices as journalled within the holding arm boxings relative to the associated tree trunk when of maximum diameter and relative to each other.
Figure 8:
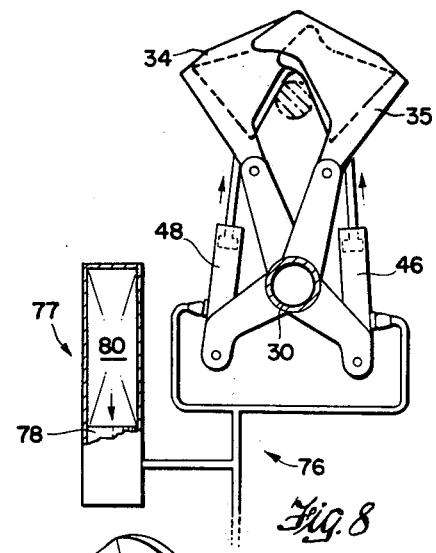
FIG. 8 similar to FIG. 7 but shows the roller-puller devices and containing holding-arm boxings in the position of maximum intersection thereof as viewed in Plan when surrounding a tree of minimum diameter.

In FIG. 5 where a view through the frame 30 is provided to show the knife blades in plan view, the position of the holding arms 34 and 35 at about the largest allowable diameter of trunk is shown. It might appear as if at point 70 delimbing would be missed by stationery knife 42 (FIG. 4). However, that would occur only when the tree is of largest diameter at the butt where there are seldom any living limbs. As the butt of the tree advances through the pullers, overlap of the blades of the knives occurs soon closing the gap. FIG. 6 shows how a small diameter of tree is completely surrounded by the blades. The action of the hydraulic cylinders adjusting the arms inward as the tree narrows in diameter keeps part of each blade in contact with the tree since the blades are carried by the arms and tension means 51, 52 assist to pull the blades inward. The stationary blade 42, will cut fewer limbs as a tree narrows but the apex 72 of the curve of the blade will always function as is shown in FIG. 6. It will be understood that the above action and function is achieved by the method of spacing the arms and blades above one another as shown and by the mode of mounting the components together in the eccentric manner shown.

Figure 9:
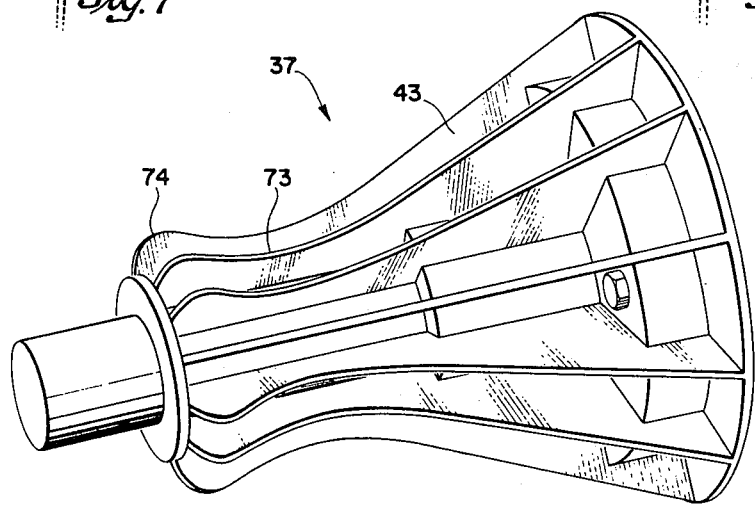
FIG. 9 is a view of the roller-puller device showing its unique profile for grabbing bolts of varying diameter so as to draw them through the machine with increasing speed as their diameter is reduced.

FIG. 9 shows one of the puller-rollers 37 or 38. It is a novel feature of this invention that these rollers are uniquely adapted by their shape including the contour of the fins 43, to pull a tree through the adjacent delimbing knives with a substantially constant force regardless of tree-diameter.

The hydraulic motors in the holding arms are constructed and operate in such a way that they produce a constant torque at a constant speed. The feed rollers 37, 38 which are bolted directly to the motors, transform the rotary power and torque of the motors to the linear motion in the tree. As the distance between the axis of the rollers and the point of contact with the tree increases, the force transmitted decreases and the speed transmitted to the surface of the tree increases. To benefit from this fact, the geometry governing the rotation of the holding arms has been designed to locate the greatest diameter of a tree at the narrowest portion of the cone 73, of the feed rollers where the force is greatest. At this point the tree will be at its full length and heaviest weight but there will be generally few branchest to cut. The lower speed and greatest force will be an advantage. It is a known fact that a high striking velocity is ideal for cutting branches on Black Spruce. For this reason, as the tree tapers, the geometry of the holding arms drives the tree upward along the slope of the cone shaped puller or feed roller thereby increasing the linear speed of the tree. As the bolts are cut off, the tree gets lighter and therefore the decrease in force transmitted is not significant. However, the increase in linear speed which occurs simultaneously becomes an advantage since the branches are found in greater numbers at the top of the tree.

The small rise 74 at the narrow end of the roll puller is created to assist in holding the tree into the section 73, and assist the feed to the knives.

In the preferred embodiment of the invention an eighty-two brake horse-power diesel power unit 18 is used to propel the vehicle and to operate the hydraulically actuated components of the boom and processor. The hydraulic system is composed of three stacked gear pumps driven from the diesel flywheel through a clutch. The working pressure of the hydraulic pumps being of 2,000 pounds per square inch.

The hydraulic oil accumulating device 77, is shown in operation in FIGS. 5 and 6 where it is connected into the hydraulic line 76 to the cylinders 46 and 48. The accumulator 77, comprises a piston operated on one side by compressed gas and the other side connected to the oil line 76. The gas is shown as 80. In the views shown the valves to the pumps are closed and there is no flow to the cylinders 46, 48 as a fixed pressure has been set in the system adequate to hold the arms and knives in working force against the tree. As the tree diameter lessens the compressed gas in the accumulator forces the piston 78, down and the oil is forced into the cylinders 46 and 48, thereby adjusting the arms 34 and 35 and the knives 40 and 41 to the reduced diameter of tree.

In order to maintain the delimbed tree trunk spaced from and parallel with the frame or column 30, a pair of trunk-spacing idler-rollers (FIGS. 4, 12 and 13) is provided, same comprising an upper roller 82, and a lower roller 84, said rollers being truncated cones having surrounding walls which are concave relative to the roller axes. The surrounding walls are also toothed or grooved between the base 86 and apex 88 thereof as at 90 to bite into the trunk-wood under pressure by the upper and lower puller-rollers 43 and 38 respectively.

The axes 92 (FIG. 4) of the rollers coincide with the horizontal plane of the axes of the powered puller-rollers 37–38. From study of FIGS. 4, 12 and 13 in combination it will thus be clear that a tree-trunk is held surrounded very securely on the inner or column 30 side by the concave walls of the rollers 82–84 and on the outer side by the holding arms 34 and 35.

In FIG. 4 the relative position of roller 82 is indicated by its stub shaft 94 which is shown journalled in plate 96 secured at its upper and lower edges to the edge of the upper of the pair of fixed mounting brackets 98 and 99 immediately below the pair of supports 58 for the knife 41. From FIGS. 12 or 13 however each of the rollers 82 and 84 is to be understood as journalled in a plate or bearing 100 spanning a pair of upper and lower projecting mounting brackets 102 and 104 between the pairs of brackets 98–99 so that the axes of rollers 82 and 84 are horizontally co-planar with the axes of the respective rollers 37 and 38.

In the modification of FIG. 10 instead of a delimbing knife or blade such as 40 or 41 of FIG. 4 which is independently rotatable relative to arms 34–35, a pair of knives or blades 106 is provided which is detachably mounted on the associated arms 34–35, such knife embodying an upstanding blade portion 108 and an attaching flange 110 at right angles to 108 so as to lie against the upper surface of arms 34–35, the flanges and the arms being drilled, and the latter tapped at intervals for the reception of screws 112 by which each knife and flange assembly can be bolted to one of the arms for removal therefrom and replacement when in need of re-sharpening.

In FIG. 11 there is depicted a second modification of a pair of knife assemblies, the same in this instance being secured permanently to the inner edge of the arms 34 and 35. This, like the removable modification of FIG. 10 is of L-shaped transverse cross-section and consists of the upstanding knife blade portion 114, and the outwardly porjecting flange portion 116 at right angles to 114. The portions 116 are welded as shown to the adjacent arms and the knife portions 114 are preferably buttressed from the outer or rear sides by a set of triangulated buttress plates 118 which are welded to the knife portion and the upper surface of the flange portion.

Various modifications may be made to the invention described and be within the scope of the concept disclosed. It is intended, therefore, that the foregoing disclosure shall be considered as illustrative of such conept and not as limiting the protection sought to any particular embodiment thereof.

What is claimed:
1. In a tree harvester of the class comprising a tree cutting and delimbing unit which first severs a tree trunk after effecting a gripping embrace of the tree and then draws the trunk through the unit to effect delimbing, a plurality of trunk gripping pulling-rollers effecting said draw, characterised in that said rollers have gripping surfaces which are longitudinally and circumferentially concave relative to their rotary axes, said delimbing unit including at least two trunk-holding arms at least partially embracing said trunk, and a delimbing knife attached to at least one of said arms for movement therewith, said delimbing knife having a concave inner surface, said rollers being so journalled between the ends of said arms as to span the same.

2. A tree harvester having generally linear support means and tree holding, cutting and delimbing means projecting from said support means, including arms adapted and designed to embrace said tree over surface portions of said tree which are on the side remote from said support means, means operatively associated with said arms for moving said tree longitudinally, and means in the form of at least one axially angulated circumferentially concavely conical and truncated positioning roller adapted and designed partially to embrace said tree over the side area thereof which is closest to said support means, an axial plane of said roller co-inciding with the horizontal axis of said means for moving said tree whereby, as viewed in plan, said tree is seen to be embraced over spaced surface portions around it's circumference, for maintaining said tree substantially uniformly spaced from and parallel to said support means during the cutting and delimbing thereof.

3. The invention according to claim 2 in which said means for moving said tree is in the form of at least two spaced rollers positioned alternately on either side of a vertical plane axially bisecting said support means and said tree and at least two of said positioning rollers, 4. The invention according to claim 3 in which said positioning rollers are stub-shafted to supporting brackets projecting from said support means at differing radial angles, the axies of the said positioning rollers intercepting as viewed in plan whereby said positioning rollers are substantially oppositely directed to embrace said tree around the same arcuate surface portion thereof but at differing positions on the length thereof.

* * * * *